(12) United States Patent  (10) Patent No.: US 8,111,186 B2
Bunch et al.  (45) Date of Patent: Feb. 7, 2012

(54) SYSTEMS AND METHODS FOR INFERING HAIL AND LIGHTNING USING AN AIRBORNE WEATHER RADAR VOLUMETRIC BUFFER

(75) Inventors: Brian Paul Bunch, Snohomish, WA (US); Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 118 days.

(21) Appl. No.: 12/641,149

(22) Filed: Dec. 17, 2009

(65) Prior Publication Data

US 2011/0148694 A1   Jun. 23, 2011

(51) Int. Cl.
*G01S 13/95* (2006.01)
(52) U.S. Cl. ..................... 342/26 B; 342/26 R
(58) Field of Classification Search ............... 342/26 R, 342/26 B
See application file for complete search history.

(56) References Cited

U.S. PATENT DOCUMENTS

| 6,405,134 | B1 * | 6/2002 | Smith et al. | 702/4 |
| 7,109,913 | B1 * | 9/2006 | Paramore et al. | 342/26 B |
| 7,242,343 | B1 | 7/2007 | Woodell | |
| 7,292,178 | B1 | 11/2007 | Woodell et al. | |
| 7,515,087 | B1 * | 4/2009 | Woodell et al. | 342/26 B |
| 7,868,811 | B1 * | 1/2011 | Woodell et al. | 342/26 B |

OTHER PUBLICATIONS

Futyan, et al.; Relationships between lightning and properties of convective cloud clusters; Geophysical Research Letters, vol. 34, 2007.
Churma, et al.; Evaluation of the AWIPS thunderstorm product; Techniques Development Laboratory, Office of Systems Development, National Weather Service, NOAA; Silver Spring, Maryland; 1996.
David L. Darcangelo; Forecasting the onset of cloud-ground lightning using layered vertically integrated liquid water; Pennsylvania State University, Aug. 2000, (pp. 1-71).
Donald R. Fitzgerald; Probable aircraft "triggering" of lightning in certain thunderstorms; Air Force Cambridge Research Laboratories, Bedford, Mass., Dec. 1967, pp. 835-842, vol. 95, No. 12.

(Continued)

*Primary Examiner* — Ian Lobo
(74) *Attorney, Agent, or Firm* — Lowe Graham Jones PLLC

(57) ABSTRACT

A weather radar system for improving output of potential lightning and hail weather conditions. An exemplary system includes a processor that receives and stores the weather radar reflectivity values into a three-dimensional buffer, receives an outside air temperature value, and determines freezing level based on the received outside air temperature value. The processor generates lightning icon(s) when a reflectivity value stored at cell(s) of the three-dimensional buffer above determined freezing level is greater than a first threshold amount. Also, the processor adds 1.6 km to the determined freezing level and generates hail icon(s) when a reflectivity value stored at cell(s) at the determined freezing level plus 1.6 km are greater than a second threshold amount. The display device displays the hail and lightning icons when an altitude value that corresponds to the cells associated with the generated lightning icons has been selected for display.

18 Claims, 4 Drawing Sheets

OTHER PUBLICATIONS

Goodman, et al.; The North Alabama lightning mapping array: recent severe storm observations and future prospects; Atmospheric Research 76 (2005) 423-437.

Waldvogel, et al.; Criteria for the detection of hail cells; American Meteorological Society, Dec. 1979, pp. 1521-1525.

Uman, et al.; The interaction of lightning with airborne vehicles; Progress in Aerospace Sciences 39 (2003) 61-81, Gainesville, FL.

Foote, et al.; Hail metrics using conventional radar; National Center of Atmospheric Research, Boulder, CO; Weather Modification Inc., Fargo, ND.

Weems, et al.; Lightning watch and warning support to spacelift operations; 45 Weather Squadron, Patrick AFB, FL.

Nicholas L. Wilson, et al., The complementary use of TITAN-derived radar and total lightning thunderstorm cells, 32nd Conference on Radar Meteorology, Oct. 26, 2005, pp. 1-10, sections 2,3,4 and 5.

Gremillion, Michase S., et al., Thunderstorm characteristics of Cloud-to-Ground lightning at the Kennedy Space Center, Florida; A study of lightning initiation signatures as indicated by the WSR-88D, Weather Forcasting, vol. 14, No. 5, Oct. 1, 1999, pp. 640-649.

* cited by examiner

SYSTEMS AND METHODS FOR INFERING HAIL AND LIGHTNING USING AN AIRBORNE WEATHER RADAR VOLUMETRIC BUFFER

BACKGROUND OF THE INVENTION

Since their introduction in the 1950s, airborne weather radar systems have primarily provided an indication of weather "reflectivity" in the field of view of the radar. Reflectivity is a radar parameter and is roughly correlated to rainfall rate. These first radars displayed reflectivity only in grayscale and were not necessarily well calibrated. However, in those early days, the ability to see where there was and wasn't rainfall was a great improvement to flying blind or making very conservative circumnavigations to avoid weather.

As weather radar evolved, improvements in the accuracy of reflectivity measurements were made, along with improved display capability, first with the introduction of digital radar, which provided monochromatic but discrete levels of reflectivity indication. This was followed by the introduction of color displays allowing increasing reflectivity levels to be displayed as green, yellow, and red.

In the 1980s several radars were introduced that provided turbulence detection capability. The 1990s saw the introduction of predictive windshear detection and alerting capability in some air transport category radars.

In 2004, Honeywell International, Inc. introduced a line of radars with volumetric buffer capability, which made notable improvements in the display and analysis of reflectivity data.

While these have all been significant improvements, the weather reflectivity and turbulence display functions have some limitations with respect to the desired goal of presenting to the crew a direct indication of hazards. For example:

Reflectivity is not directly associated with hazard. In stratiform precipitation, red level indications can often occur, although there is not necessarily a weather-related hazard.

Turbulence detection is limited in range to 40 NM (although some improvements may be on the way to extend this to as far as 60 NM).

Conversely, there are weather hazards that are not associated with reflectivity or turbulence levels that airborne weather radar can detect, most notably clear turbulence (often due to nonprecipitation air mass boundaries or mountain-induced activity) and also including icing conditions.

In any case, given the current operational environment with emphasis on on-time performance and fuel efficiency, there is demand to provide the flight crew with as much information as possible regarding weather hazards to ensure correct decision making.

SUMMARY OF THE INVENTION

The present invention provides a weather radar system for predicting existence of lightning and hail weather conditions without range limits. An exemplary system generates radar signals and receives weather radar reflectivity values based on the radar signals. A processor receives and stores the weather radar reflectivity values into a three-dimensional buffer, receives an outside air temperature value, and determines freezing level based on the received outside air temperature value. The processor generates one or more lightning icons when a reflectivity value, stored at one or more cells of the three-dimensional buffer above the determined freezing level, is greater than a first threshold amount. A display device displays the one or more lightning icons when an altitude value that corresponds to the one or more cells associated with the generated lightning icons has been selected for display.

In addition, the processor adds 1.6 kilometers (km) to the determined freezing level and generates one or more hail icons, when a reflectivity value stored at one or more cells of the three-dimensional buffer at the determined freezing level plus 1.6 km is greater than a second threshold amount. The display device displays the one or more hail icons when an altitude value that corresponds to the one or more cells associated with the generated lightning icons has been selected for display.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
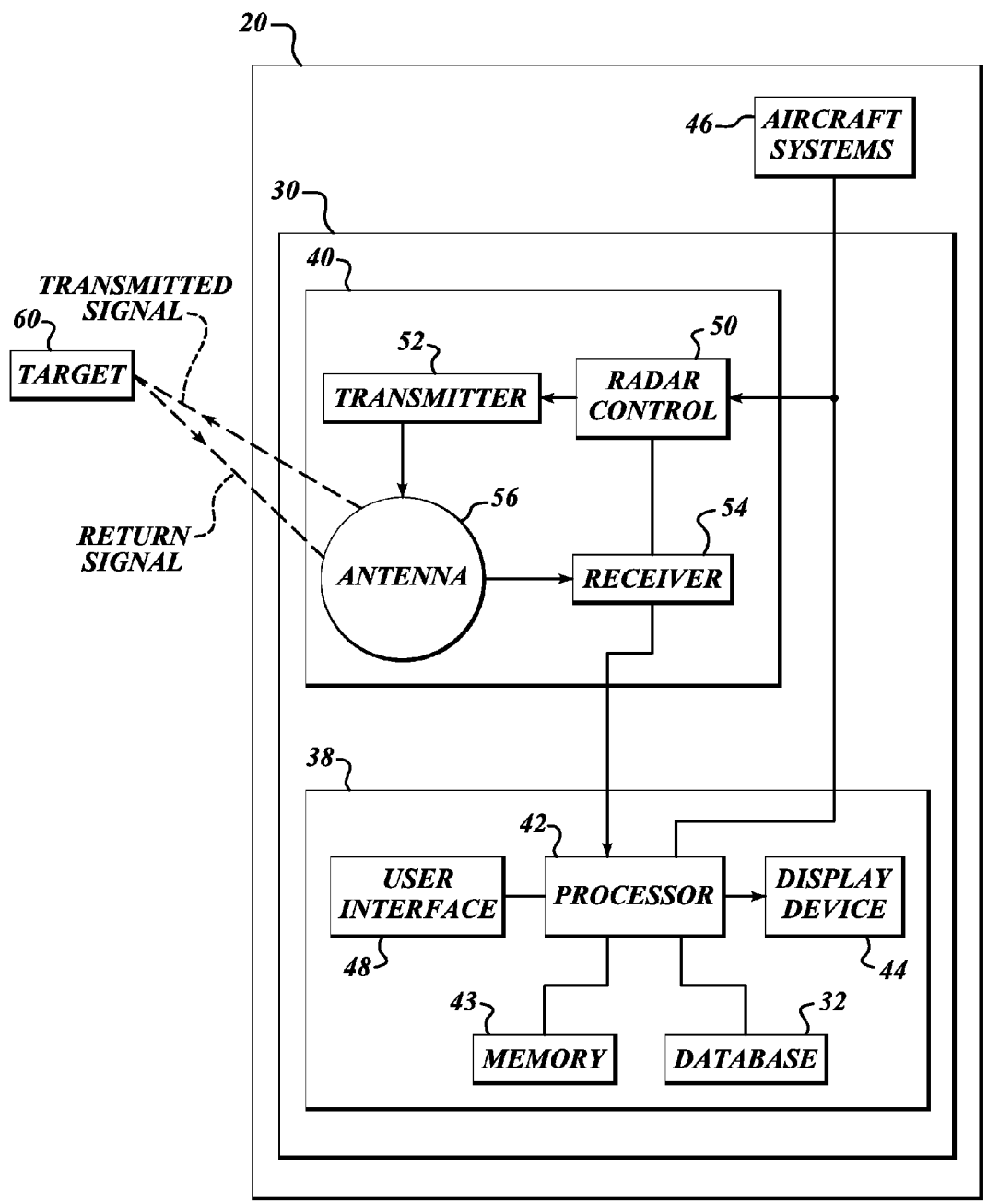
FIG. 1 is a schematic block diagram of a system formed in accordance with an embodiment of the present invention.

FIG. 1 illustrates an embodiment of a weather display system 30 for providing improved weather radar display functionality. The exemplary weather display system 30 includes a weather radar system 40 and a display/interface front-end 38, and receives information from an aircraft system 46. The display/interface front-end 38 includes a processor 42, memory 43, a display device 44, a user interface 48, and a database 32. An example of the radar system 40 includes a radar controller 50 (coupled to the user interface 48), a transmitter 52, a receiver 54, and an antenna 56. The radar controller 50 controls the transmitter 52 and the receiver 54 for performing the sending and receiving of signals through the antenna 56. The weather radar system 40 and the display/interface front-end 38 are electronically coupled to the aircraft system 46.

Radar relies on a transmission of a pulse of electromagnetic energy, referred to herein as a signal. The antenna 56 narrowly focuses the transmission of the signal pulse in comparison with the whole breadth of a desired downrange image. Like the light from a flashlight, this narrow signal illuminates any objects in its path and illuminated objects reflect the electromagnetic energy back to the antenna.

Reflectivity data correspond to that portion of a radar's signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

The radar controller 50 calculates the distance of the weather object relative to the antenna, based upon the length of time the transmitted signal pulse takes in the transition from the antenna to the object and back to the antenna 56. The relationship between distance and time is linear as the velocity of the signal is constant, approximately the speed of light in a vacuum.

The memory 43 of the system 30 includes a three-dimensional volumetric buffer for storing the reflectivity data. The system 30 has the capabilities of inferring lightning and/or hail occurrence, based on the reflectivity values stored in the volumetric buffer.

Figure 2:
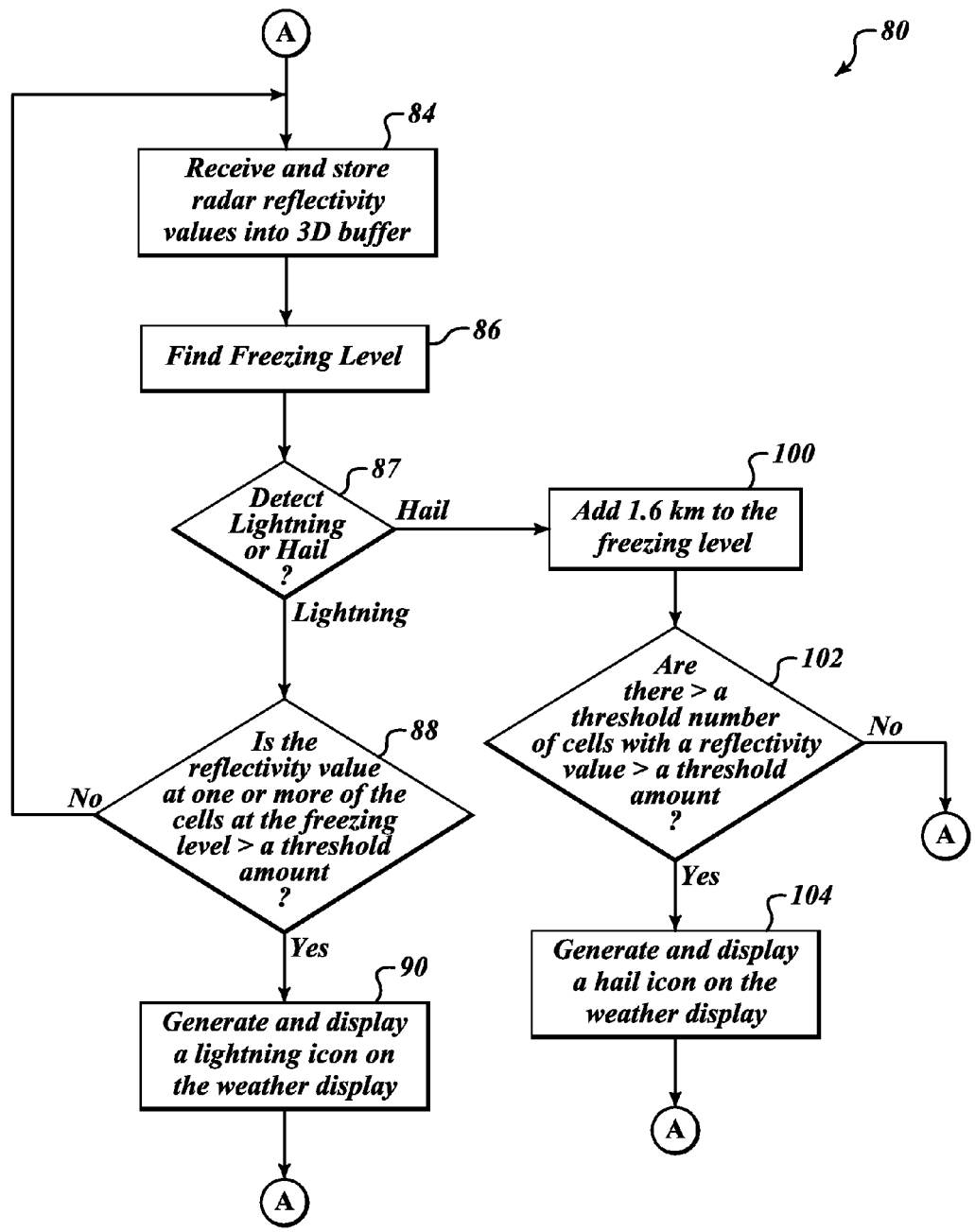
FIG. 2 is a flowchart of an exemplary process performed by the system shown in FIG. 1.

FIG. 2 is a flowchart of an exemplary process 80 performed by the system shown in FIG. 1. First at a block 84, the processor 42 receives radar reflectivity values from the radar system 40 and stores them in the three-dimensional buffer. Next, at a block 86, the processor 42 determines the freezing level, based on present aircraft altitude and current outside air temperature received from the aircraft system 46. The freezing level is calculated from the current aircraft altitude and outside air temperature using a standard lapse rate—other temperature calculation models may be used.

In one embodiment, lightning and hail determinations are performed simultaneously, at decision block 87. For the lightning determination, the process 80 determines at a decision block 88 if reflectivity values stored above determined freezing level in the three-dimensional buffer are greater than a predefined amount. This condition may also include the additional limitation of requiring a threshold number of adjacent cells to have reflectivity values above the predefined amount. If a stored reflectivity value is not greater than the predefined amount, then the process 80 returns to the block 84 or to block 88 to check other cells. If a reflectivity value of a cell or reflectivity values of a threshold number of adjacent cells is greater than the threshold amount, then at a block 90 a lightning icon is generated and displayed on the weather display (or multifunction display (MFD)). The process 80 then returns to the block 84 to repeat.

For the hail determination, 1.6 km is added to the freezing level, at a block 100. Next, the process 80 determines at a decision block 102 if there exists proximate cells within the three-dimensional buffer greater than a threshold number that include reflectivity values greater than a threshold amount. A single cell could satisfy this condition. If there are cells satisfying this condition, then the processor 42 generates a hail icon(s) and displays it on the weather display or MFD, block 104. After block 104 or if the condition of the decision block 102 is not met, the process 80 returns to block 84 to repeat.

In one embodiment, the reflectivity threshold for determining the existence of lightning is set at 35 dBZ (decibels of Z (radar echo intensity/reflectivity)) and the lightning reference altitude is set relative to the freezing level.

In one embodiment, an additional limitation is included before a determination of possible existence of lightning. After block 88 in FIG. 2, the processor 42 calculates Echo top temperature and if the echo top temperature is colder than a threshold temperature then the lightning icon is outputted. The echo top temperature could be calculated from the following equation:

Echo top temperature)=(Outside air temperature)−
[(Echo top altitude)−(Aircraft altitude)]*
(Standard atmosphere lapse rate).

Echo top altitude may be determined using the stored reflectivity values in the three-dimensional buffer or by analyzing the radar scan data as it is received. An example threshold temperature is −20 C, but other temperatures may be used.

Figure 3:
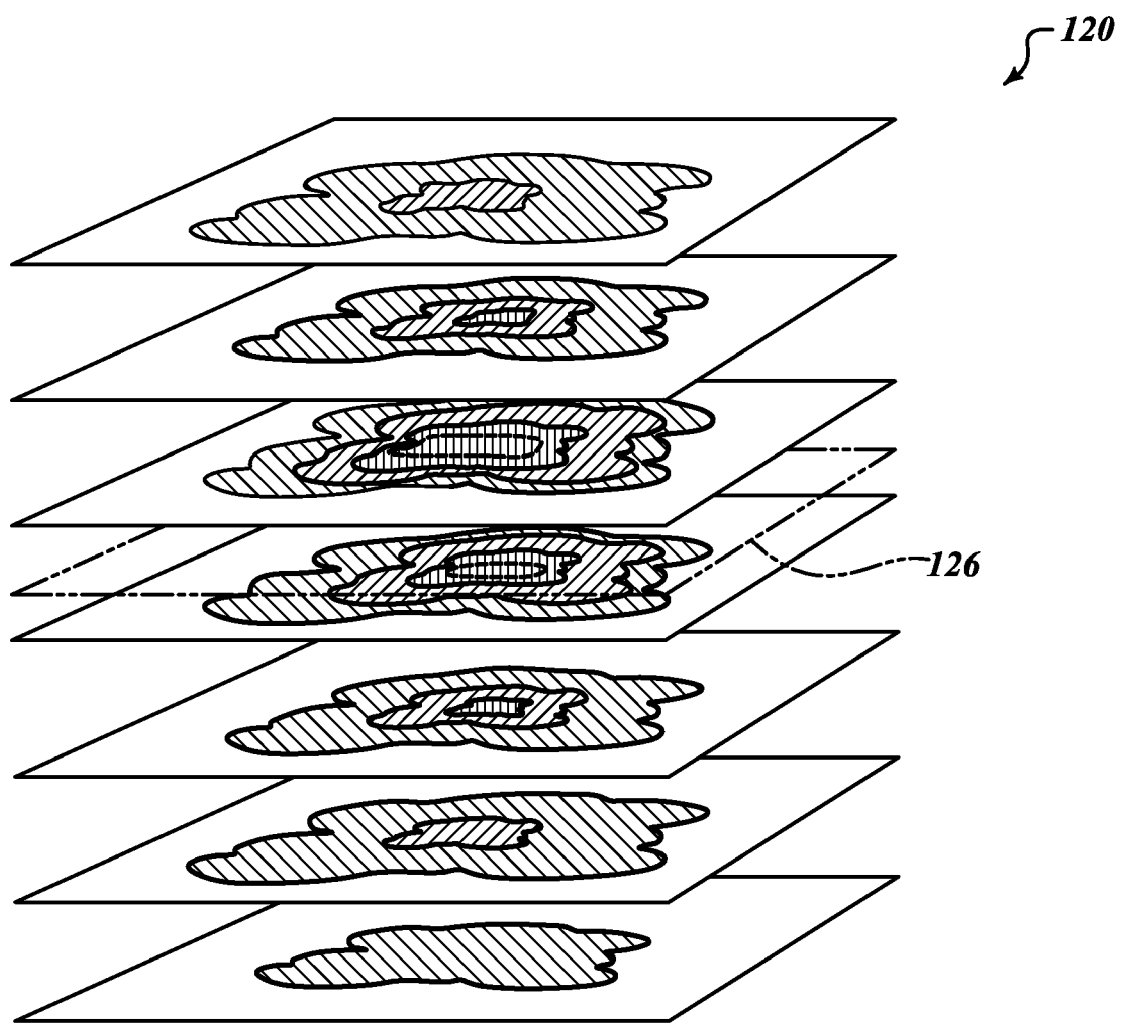
FIG. 3 is conceptual perspective view of layers of graphical representations of the reflectivity values stored in the three-dimensional buffer.

FIG. 3 is a conceptual perspective view of planar slices 120 of reflectivity values (cells) stored in the three-dimensional buffer. A hail reference altitude plane 126 is equivalent to the freezing level plus a threshold amount (e.g., 1.6 km). Other threshold amounts may be used. In this example, the hail reference altitude plane 126 is an interpolation of the data in the planes above and below plane 126. If at the plane 126 the reflectivity values for a threshold number of adjacent cells are above a predefined reflectivity value, then they are inferred as a hail hazard area. In one embodiment, the predefined reflectivity value for causing an inference of hail is 45 dBZ.

Figure 4:
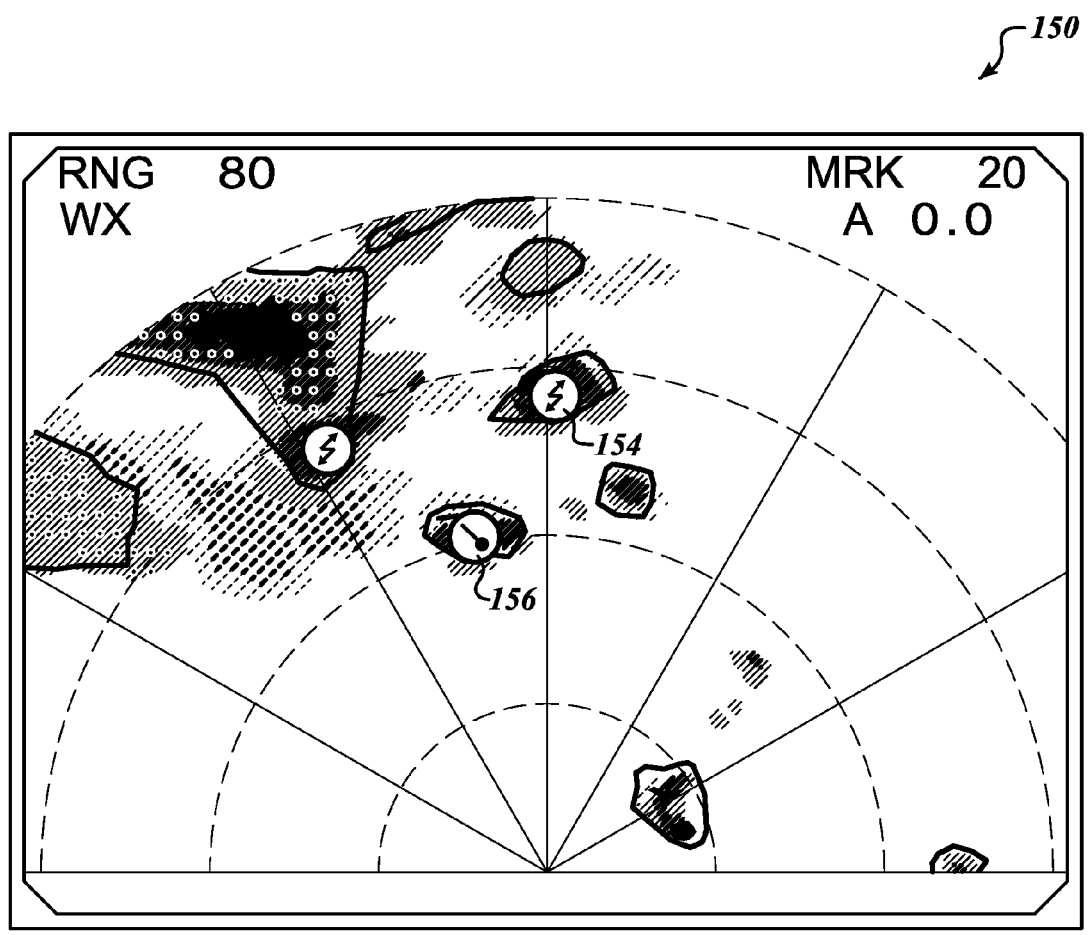
FIG. 4 is an exemplary screen shot of a weather display that shows hail and lightning icons generated upon inference of their existence.

FIG. 4 is a screen shot (god's eye view) of a weather display 150 generated by the system 30 of FIG. 1, after it has been determined that lightning and hail inferences have been determined using the radar reflectivity values stored in the three-dimensional buffer. A lightning icon 154 is displayed to show lightning inferences. A hail icon 156 is displayed to show hail inferences.

In one embodiment, the three-dimensional buffer is not used. The system would analyze either the radar reflectivity data associated with the freezing level or at the hail reference altitude as soon as the data is received. Little or no buffering is performed.

While the preferred embodiment of the invention has been illustrated and described, as noted above, many changes can be made without departing from the spirit and scope of the invention. For example, other altitudes relative to the freezing level can be used. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed on an aircraft, the method comprising:
   automatically receiving weather radar reflectivity values;
   automatically receiving an outside air temperature value;
   automatically determining freezing level based on the received outside air temperature value;
   automatically generating one or more lightning or hail icons when a received reflectivity value is greater than a respective lightning or hail threshold amount relative to the determined freezing level; and
   automatically displaying the one or more lightning or hail icons on a weather display based on a display selection,
   wherein automatically generating one or more lightning icons comprises generating the one or more lightning icons when the received reflectivity value is greater than a respective lightning threshold amount above the determined freezing level and an echo top temperature is less than an echo top temperature threshold.

2. The method of claim 1, further comprising automatically storing the weather radar reflectivity values into a three-dimensional buffer, wherein automatically generating one or more lightning or hail icons further comprises automatically generating one or more lightning or hail icons only when a threshold number of adjacent cells includes reflectivity values greater than the respective lightning or hail threshold amount.

3. The method of claim 1, wherein the lightning threshold amount is within a threshold amount from 35 dBZ.

4. The method of claim 3, wherein the lightning threshold amount is 35 dBZ.

5. The method of claim 1, further comprising automatically storing the weather radar reflectivity values into a three-dimensional buffer, wherein automatically generating one or more hail icons comprises:
   automatically adding a threshold value to the determined freezing level;
   automatically generating one or more hail icons when a reflectivity value stored at one or more cells of the three-dimensional buffer above determined freezing level plus the threshold value is greater than a hail threshold amount; and automatically displaying the one or more hail icons on the weather display when an altitude value that corresponds to the one or more cells associated with the generated hail icons has been selected for display.

6. The method of claim 5, wherein automatically generating one or more hail icons further comprises automatically generating one or more hail icons only when a threshold number of adjacent cells includes reflectivity values greater than the hail threshold amount.

7. The method of claim 5, wherein the hail threshold amount is within a threshold amount from 45 dBZ.

8. The method of claim 7, wherein the hail threshold amount is 45 dBZ.

9. The method of claim 5, wherein the threshold value is within a threshold from 1.6 km.

10. A weather radar system having radar components for generating radar signals and receiving weather radar reflectivity values based on the generated radar signals, the system comprising:
 a memory configured to store the received weather radar reflectivity values in a three-dimensional buffer;
 a processor in signal communication with the memory and the radar components, the processor configured to:
  receive weather radar reflectivity values;
  receive an outside air temperature value;
  determine freezing level based on the received outside air temperature value;
  generate one or more lightning icons when a received reflectivity value is greater than a respective lightning threshold amount relative to the determined freezing level;
  add a threshold value to the determined freezing level; and
  generate one or more hail icons when a reflectivity value stored at one or more cells of the three-dimensional buffer at the determined freezing level plus the threshold value is greater than a hail threshold amount; and
 a display device in signal communication with the processor, the display device configured to display the one or more lightning icons based on a display selection and to display the one or more hail icons when an altitude value that corresponds to the one or more cells associated with the generated hail icons has been selected for display.

11. The system of claim 10, further comprising a memory comprising a three-dimensional buffer, wherein the processor generates the one or more lightning or hail icons only when a threshold number of adjacent cells in the three-dimensional buffer include reflectivity values greater than the respective lightning or hail threshold amount.

12. The system of claim 10, wherein the lighting threshold amount is within a threshold amount from 35 dBZ.

13. The system of claim 12, wherein the lighting threshold amount is 35 dBZ.

14. The system of claim 10, wherein the processor generates one or more hail icons only when a threshold number of adjacent cells include reflectivity values greater than the hail threshold amount.

15. The system of claim 10, wherein the hail threshold amount is within a threshold amount from 45 dBZ.

16. The system of claim 15, wherein the hail threshold amount is 45 dBZ.

17. The system of claim 10, wherein the threshold value is within a threshold from 1.6 km.

18. A system comprising:
 a means for receiving and storing weather radar reflectivity values into a three-dimensional buffer;
 a means for receiving an outside air temperature value;
 a means for determining freezing level based on the received outside air temperature value;
 a means for generating one or more lightning icons when a reflectivity value stored at one or more cells of the three-dimensional buffer above determined freezing level is greater than a first threshold amount;
 a means for displaying the one or more lightning icons on a weather display when an altitude value that corresponds to the one or more cells associated with the generated lightning icons has been selected for display;
 a means for adding 1.6 km to the determined freezing level;
 a means for generating one or more hail icons when a reflectivity value stored at one or more cells of the three-dimensional buffer at the determined freezing level plus approximately 1.6 km is greater than a second threshold amount; and
 a means for displaying the one or more hail icons on the weather display when an altitude value that corresponds to the one or more cells associated with the generated hail icons has been selected for display.

* * * * *